(12) United States Patent
Ying et al.

(10) Patent No.: US 11,387,891 B2
(45) Date of Patent: Jul. 12, 2022

(54) METHODS, DEVICES AND COMPUTER PROGRAM PRODUCTS FOR ANTENNA SELECTION IN A COMMUNICATION SYSTEM

(71) Applicant: SONY GROUP CORPORATION, Tokyo (JP)

(72) Inventors: Zhinong Ying, Lund (SE); Thomas Bolin, Lund (SE); Olof Zander, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/416,943

(22) PCT Filed: Dec. 28, 2018

(86) PCT No.: PCT/US2018/067787
§ 371 (c)(1),
(2) Date: Jun. 21, 2021

(87) PCT Pub. No.: WO2020/139360
PCT Pub. Date: Jul. 2, 2020

(65) Prior Publication Data
US 2022/0085864 A1    Mar. 17, 2022

(51) Int. Cl.
*H04L 5/12* (2006.01)
*H04L 23/02* (2006.01)
*H04B 7/08* (2006.01)
*H04B 1/40* (2015.01)
*H04B 7/06* (2006.01)

(52) U.S. Cl.
CPC ............. *H04B 7/0871* (2013.01); *H04B 1/40* (2013.01); *H04B 7/0602* (2013.01); *H04B 7/0689* (2013.01); *H04B 7/0802* (2013.01)

(58) Field of Classification Search
CPC ...... H04B 7/0871; H04B 1/40; H04B 7/0602; H04B 7/0689; H04B 7/0802
USPC ......................................................... 375/262
See application file for complete search history.

(56) References Cited

PUBLICATIONS

3GPP TSG RAN WG1 Meeting #90, Prague, P.R. Czechia Aug. 21-25, 2017, Intel Corporation (Year: 2017).*
3GPP TSG RAN WG1 #87, Reno, USA, Nov. 14-18, 2016, CMCC (Year: 2016).*
Rapid Fading Due to Human Blockage in Pedestrian Crowds at 5G Millimeter-Wave Frequencies, Gorge R MAcCartney, Theodore S. Rappaport, And Sandeep Rangan, NYU Tandon School of Engineering (Year: 2017).*

(Continued)

*Primary Examiner* — Tanmay K Shah
(74) *Attorney, Agent, or Firm* — Myers Bigel, P.A.

(57) ABSTRACT

A method for antenna selection, performed by a user equipment, UE, in a wireless communication system includes determining signal performance of a signal received by the UE. The signal is received by an array antenna of the UE for communication with a network node of the wireless communication system. The method includes determining a signal decay rate associated with the signal performance of the signal, and replacing the array antenna with an omnidirectional antenna of the UE for communication with the network node, based on the signal decay rate. Related devices are also described.

20 Claims, 11 Drawing Sheets

(56) References Cited

PUBLICATIONS

"International Search Report and Written Opinion of the International Searching Authority", International Application No. PCT/US2018/067787, dated Aug. 21, 2019, 14 pp.

CMCC , "Discussion on beam recovery for NR", 3GPP TSG RAN WG1 #87, R1-1612189, Agenda item: 7.1.3.3, Reno, USA, Nov. 14-18, 2016, 4 pp.

Intel Corporation , "Discussion for Mechanism to Recover from Beam Failure", 3GPP TSG RAN WG1 Meeting #90, R1-1712552, Agenda item: 6.1.2.2.7, Prague, P.R. Czechia, Aug. 25, 2017, 10 pp.

MacCartney, George R., et al., "Rapid Fading Due to Human Blockage in Pedestrian Crowds at 5G Millimeter-Wave Frequencies", GLOBECOM 2017—IEEE Global Communications Conference, Dec. 4, 2017, 7 pp.

\* cited by examiner

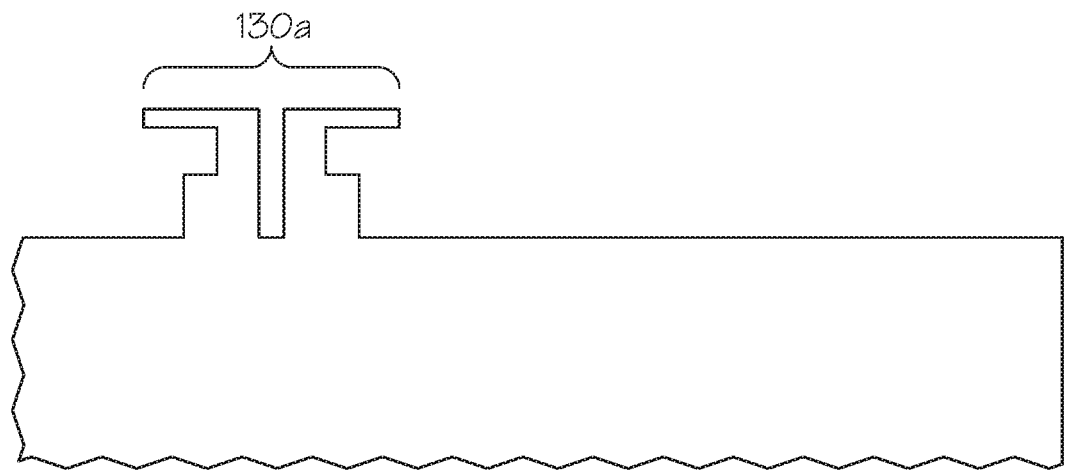
FIG. 1B
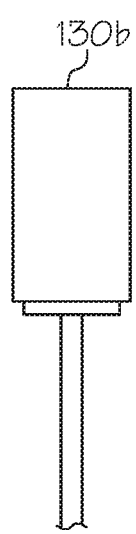
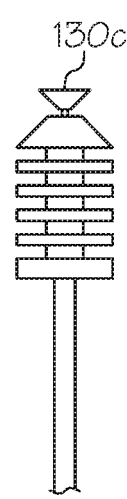
FIG. 1C  FIG. 1D

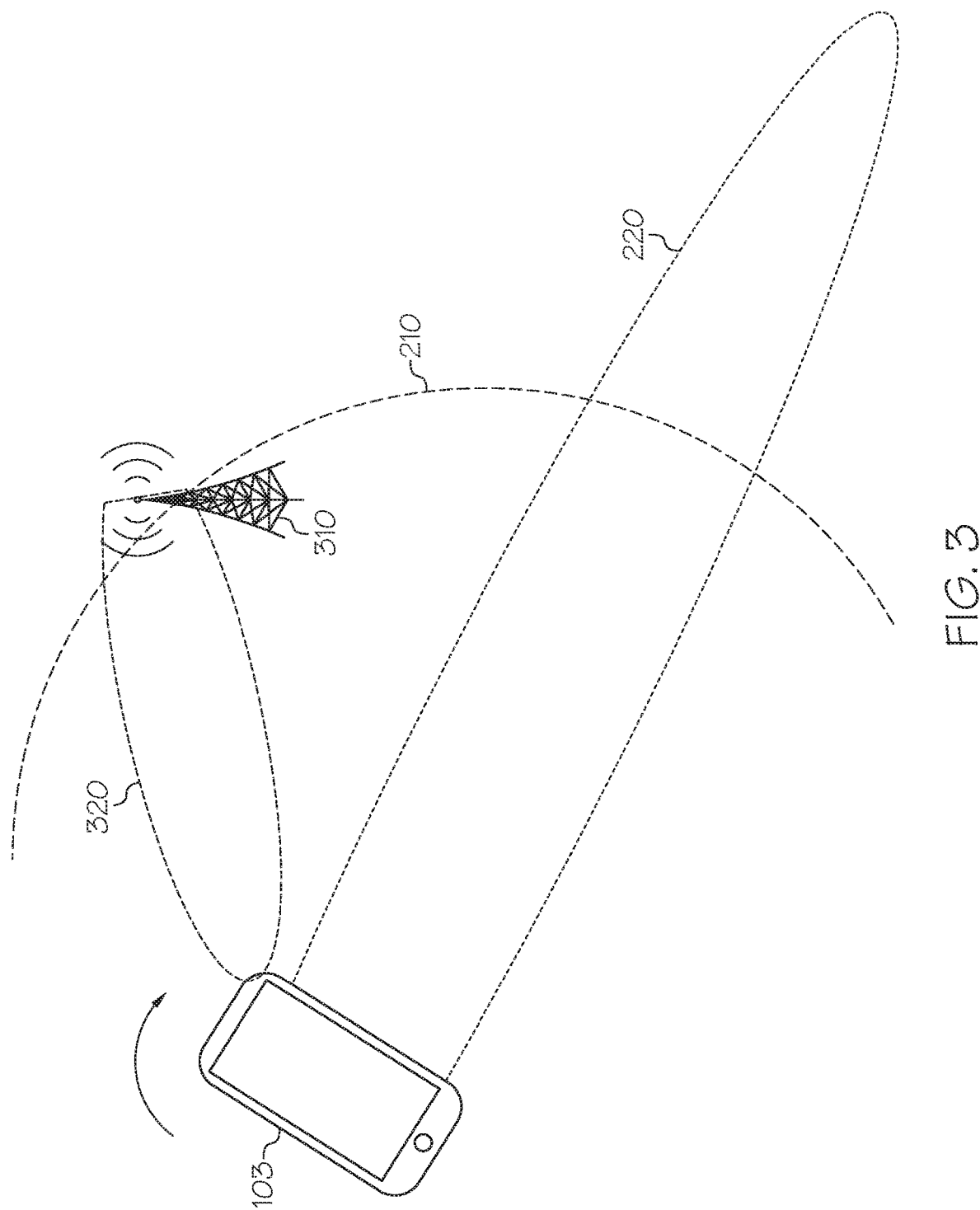

METHODS, DEVICES AND COMPUTER PROGRAM PRODUCTS FOR ANTENNA SELECTION IN A COMMUNICATION SYSTEM

CROSS-REFERENCE TO RELATED APPLICATION

The present application is a 35 U.S.C. § 371 national stage application of PCT Application No. PCT/US2018/067787, filed Dec. 28, 2018, the entire contents of which are incorporated herein by reference in its entirety. The above-referenced PCT Application was published in the English language as International Publication No. WO 2020/139360A1 on Jul. 2, 2020.

FIELD

Various embodiments described herein relate to antenna selection in a communication system.

BACKGROUND

In 5G New Radio (NR) networks, communication may occur between a base station, e.g., gNB, and a wireless electronic device, such as a user equipment (UE). Various types of antennas may be used for the communication between the base station and user equipment. However, mobility of the user equipment and/or changing channel conditions may affect the performance of the antenna.

SUMMARY

Various embodiments of the present inventive concepts include a method for antenna selection. The method may be performed by a user equipment, UE, in a wireless communication system and includes determining signal performance of a signal received by the UE. The signal is received by an array antenna of the UE for communication with a network node of the wireless communication system. The method includes determining a signal decay rate associated with the signal performance of the signal, and replacing the array antenna with an omni-directional antenna of the UE for communication with the network node, based on the signal decay rate.

The array antenna may include a beam forming antenna. Replacing the array antenna with an omni-directional antenna of the UE for communication with the network node may be further based on a profile of the signal decay rate of the signal over a time duration. Replacing the array antenna with an omni-directional antenna may include replacing the beam forming antenna with the omni-directional antenna for communication with the network node, responsive to the signal decay rate being greater than a decay rate threshold associated with the beam forming antenna. The decay rate threshold may be based on a response speed of the beam forming antenna. The signal may be a first signal, the signal performance may be a first signal performance, the signal decay rate may be a first signal decay rate, and the decay rate threshold may be a first decay rate threshold. The method may include determining a second signal performance of a second signal, where the second signal is received by the omni-directional antenna after the replacing the beam forming antenna to the omni-directional antenna. The method may include replacing the omni-directional antenna with the beam forming antenna for the communication with the network node, responsive to the second signal performance being less than a second signal performance threshold associated with the omni-directional antenna, and maintaining the communication between the UE and the network node using the omni-directional antenna, responsive to the second signal performance being greater than the second signal performance threshold associated with the omni-directional antenna.

In some embodiments, the method may include storing a second signal decay rate based on the second signal performance, responsive to the second signal performance being greater than the second signal performance threshold associated with the omni-directional antenna. The first decay rate threshold associated with the beam forming antenna may be adjusted responsive to signal quality feedback. The first decay rate threshold associated with the beam forming antenna may be adjusted responsive to the first signal decay rate and/or the second signal decay rate. The omni-directional antenna performance threshold and/or the first decay rate threshold associated with the beam forming antenna may be adjusted based on previous switching information. The first decay rate threshold associated with the beam forming antenna may be adjusted based on the second signal performance that triggered a switching decision to replace the omni-directional antenna with the beam-forming antenna. Determining the signal performance of the signal received by the UE may be triggered based on sensor data from one or more sensors. The sensor data may indicate a rotation of the UE, blocking of the signal, and/or a change in characteristics of the signal received by the UE. The beam forming antenna may be configured to use a subset of available beams to perform beam steering of the communication between the UE and the network node.

Various embodiments of the present inventive concepts include a wireless electronic device used in a wireless communication system. The wireless electronic device includes an antenna control module configured to perform operations including determining signal performance of a signal received by the wireless electronic device. The signal is received by an array antenna of the wireless electronic device for communication with a network node of the wireless communication system. The operations include determining a signal decay rate associated with the signal performance of the signal, and replacing (730) the array antenna with an omni-directional antenna of the wireless electronic device for communication with the network node, based on the signal decay rate.

In some embodiments, the array antenna may include a beam forming antenna. The signal decay rate may correspond to a derivative of a signal strength of the signal received by the wireless electronic device. Replacing the array antenna with the omni-directional antenna may include replacing the beam forming antenna with the omni-directional antenna for the communication, responsive to the signal decay rate being greater than a decay rate threshold associated with the beam forming antenna. The signal may be a first signal, the signal performance may be a first signal performance, the signal decay rate may be a first signal decay rate, and the decay rate threshold may be a first decay rate threshold. The method may include determining a second signal performance of a second signal, where the second signal is received by the omni-directional antenna after the replacing the beam forming antenna to the omni-directional antenna. The method may include replacing the omni-directional antenna with the beam forming antenna for the communication with the network node, responsive to the second signal performance being less than a second signal performance threshold associated with the omni-directional antenna, and maintaining the communication between the UE and the network node using the omni-directional antenna, responsive to the second signal performance being greater than the second signal performance threshold associated with the omni-directional antenna. The antenna module may further configured to perform operations including storing a second signal decay rate based on the second signal performance, responsive to the second signal performance being greater than the second signal performance threshold associated with the omni-directional antenna. The first decay rate threshold of the beam forming antenna may be adjusted responsive to signal quality feedback. Replacing the omni-directional antenna with the beam forming antenna may include initiating a beam search to identify beams used by the beam forming antenna for communication between the wireless electronic device and the network node.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

FIGS. 1A to 1D illustrate various antennas that may be used in wireless communication systems, according to various embodiments described herein.

FIGS. 2A, 2B, and 3 illustrate antenna selection in a communication system, according to various embodiments described herein.

DETAILED DESCRIPTION

Figure 1A:
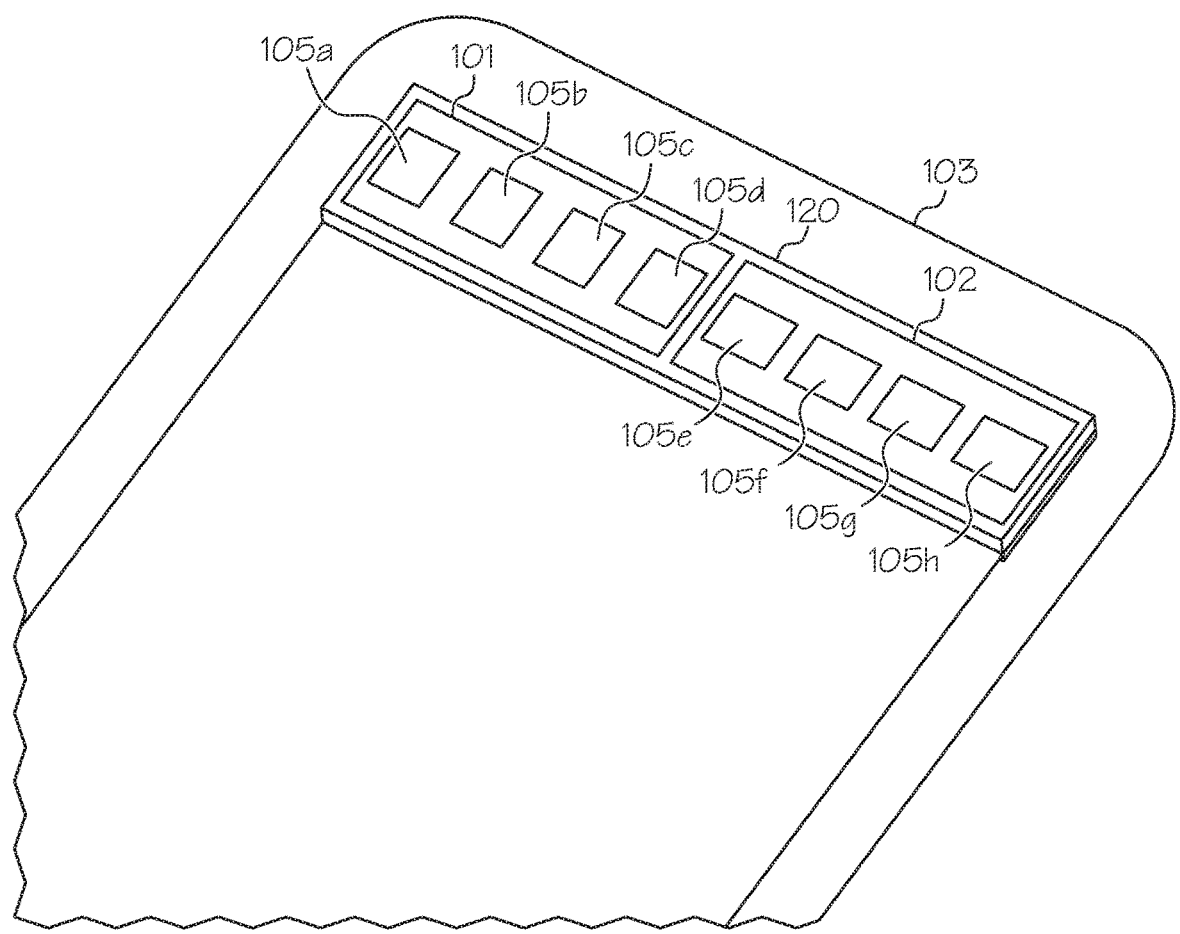

Various embodiments will be described more fully hereinafter with reference to the accompanying drawings. Other embodiments may take many different forms and should not be construed as limited to the embodiments set forth herein. Like numbers refer to like elements throughout.

Communication in 5G New Radio (NR) networks may occur between a base station, e.g., gNB, and a wireless electronic device, also referred to as a user equipment (UE). Various types of antennas may be used for the communication between the base station and the wireless electronic device. Antennas used in wireless networks may include array antennas, printed circuit board antennas, retractable antennas, and/or omni-directional antennas. A wireless electronic device, such as a UE, may include multiple types of antennas in the same device that are available for communication. An omni-directional antenna may provide a radiation pattern in most or all directions around the wireless electronic device and may have a range of 50 meters. As used herein an "omni-directional antenna" may also refer to a near omni-directional antenna. An array antenna may perform beam forming to provide a directional radiation pattern based on steerable beams. Decisions regarding antenna selection out of a variety of antennas available to the wireless electronic device may be made at the beginning of a communication. However, over the course of communication, the performance of the antenna being used may change. For example, subsequent movement of the wireless electronic device and/or changes in channel conditions may deteriorate the performance of an antenna that is communicating with a base station. For example, the user of a UE may inadvertently place a finger over the antenna, thereby changing the signal performance of communication from the UE to the base station. The UE may move to a different location and/or a different orientation and thus the signal performance may change. Various embodiments described herein may arise from the recognition that intelligent antenna selection as performance conditions change may improve quality of the communication. Specifically, signal strength, signal to noise, ratio, signal error rate, signal decay rate, and other various measures of signal quality may change during communication. Various embodiments for antenna selection may improve the signal performance as conditions change. Additionally, intelligent antenna selection may be based on an artificial intelligence learning procedure based on performance factors, such as signal decay rates and/or signal strength change rates. For example, based on deteriorating signal performance that has a high signal decay rate, the wireless communication device may replace an array antenna with an omni-directional antenna for communication with the network node. In other words, communication may be switched between an array antenna and an omni-directional antenna, as will be discussed in further detail.

In the 3GPP RAN 4 New Radio Specification TS 38.101-2, section 6.2.1.3 for Frequency Range 2 (FR2) (24.25 GHz to 52.6 GHz) power class 3 handset, the minimum peak effective isotropic radiated power has been specified to be 22.4 dBm (174 mW) and the maximum allowable total radiated power has been specified to not exceed 23 dBm (200 mW). These specifications leave a window of radiated power between Effective Isotropic Radiated Power (EIRP) and Total Radiated Power (TRP) to which an omni-directional or less than omni-directional antenna as a suitable operating antenna that can meet the specification. However, an omni-directional antenna may not be a desired solution for NR handsets since the intention may be to focus most of the transmitting power of the antenna to the base-station and thereby save battery energy and/or reduce or minimize unwanted emission in other directions in space, thus avoiding interference. The default handset initialization network search procedure may utilize directional antennas and may attempt to track the base station for as long as possible using the directional antennas. If the communication link is broken, a beam failure routine may be performed to recover communication. However, the speed of the beam tracking or beam forming may be slower than desired and the beam forming recovery procedure may not adequately respond to sudden changes of the incoming wave signal levels. For example, if the user rotates the handset quickly in space or covers the antenna with a hand or finger, normal procedures for beam forming antennas would perform repeated searches or beam sweeps both from the base station and from the handset. These beam sweeps may cause extra power consumption by the UE and may add latency or result in a lost connection.

Millimeter band radio frequencies or mm Wave channels in the electromagnetic spectrum, for example, may operate from 10 GHz to 300 GHz. Typical mm Wave channels and wave propagation scenarios may have dominant energy that is sourced from one direction in an application such as in dense urban or in indoor environment use. Almost line of sight conditions may be needed for mm Wave communication in these applications. For 2G/3G/4G networks, which operate at sub 6 GHz and which have more omnidirectional antennas, the downlink wave scattering richness may make the handset less sensitive to its orientation in space. However, mm Wave frequencies are more susceptible to movement, orientation or blocking of antennas. Switching between different antennas may depend on sensor information from an accelerometer, compass, or body proximity detector, or from received signal strength measurement data in order to provide a good and reliable network connection.

According to various embodiments described herein, as conditions change, switching between an array antenna and an omni-directional antenna may provide reliable communication with lower overall power consumption. Replacing the array antenna with the omni-directional antenna and/or replacing the omni-directional antenna with the array antenna dynamically based on signal performance may adaptively adjust the communication to changing conditions. An artificial intelligence supported UE antenna switching algorithm may be based on the incoming wave variation in signal level over time and/or be influenced by various sensor inputs such that the network connection reliability and/or battery life are improved or optimized.

NR FR2 handsets or other FR2 mobile UEs may be equipped with an algorithm to switch the transmission beam between the directional array antennas and an omni-directional antenna, with the purpose of reducing signaling overhead in the network and/or to reduce search procedures in the UE, thereby improving connection reliability and/or battery life. In some embodiments, an array antenna may be switched to a different set of array antenna elements of the array antenna for a wider beam.

An Artificial Intelligence learning procedure may be employed based on received signal strength change rates. The omni-directional antenna may be connected, for example, when the signal strength derivative exceeds a certain limit or threshold. The signal strength derivative may indicate a signal decay rate which may be correlated to how quickly the signal performance is deteriorating. Slow signal deterioration may not be as problematic as faster signal deterioration for wireless communication and particular to beam tracking of array antennas. The signal strength derivative may serve as input to the AI learning procedure. For example, a high derivative value caused by a sudden signal level drop may indicate the user is quickly moving and/or rotating the device away from the dominant incoming wave direction. This scenario may lead to a restart of the beam search procedure in legacy systems. Various embodiments of the present inventive concepts suggest switching to the omni-directional antenna, in lieu of the beam search procedure. Switching to the omni-directional antenna may occur with much less delay, such as around 1 microsecond, than performing a beam sweep, which can take several milliseconds. Thus, the connection reliability provided by this antenna switching technique may be acceptable when using a lower gain antenna. If the connection remains at a satisfactory signal level/quality after such a switch, the UE may learn the conditions under which a successful switch was executed. A different value for the signal decay rate (i.e. derivative value) may indicate that the user is blocking the antenna by a finger or a hand. The switching algorithm may switch to the other antennas and notify the user with a visual indication on the display and/or an audio indication to remove the hand or finger. If the signal quality improves, then the AI may learn that a correct action was performed based on the signal decay rate value or other performance indicator.

In some embodiments of the present inventive concept, the AI algorithm may use sensor inputs (accelerometer, compass, GNSS etc.) for the learning process. Signal level changes may be mapped with sensor input data such that the UE eventually becomes aware of its orientation in the channel and thereby more precisely responds to movement changes in space.

FIGS. 1A to 1D illustrate various antennas that may be used in wireless communication systems. FIG. 1A illustrates a wireless electronic device 103, also referred to as a UE, which includes an array antenna 120. The array antenna 120 includes an array of antenna elements 105a-105h. The antenna elements 105a-105h may be grouped together, such as a first group 101 of antenna elements 105a-105d and a second group 102 of antenna elements 105e-105h. The wireless electronic device 103 may include an omni-directional antenna, such as those illustrated in FIGS. 1B, 1C, and/or 1D.

FIG. 1B illustrates an omni-directional antenna that includes a pair of edge dipoles antennas at an edge of a PCB in a wireless communication device. FIGS. 1C and 1D illustrate cylindrical extension antennas 130b and 130c that may extend from a wireless communication device 103.

Figure 2A:
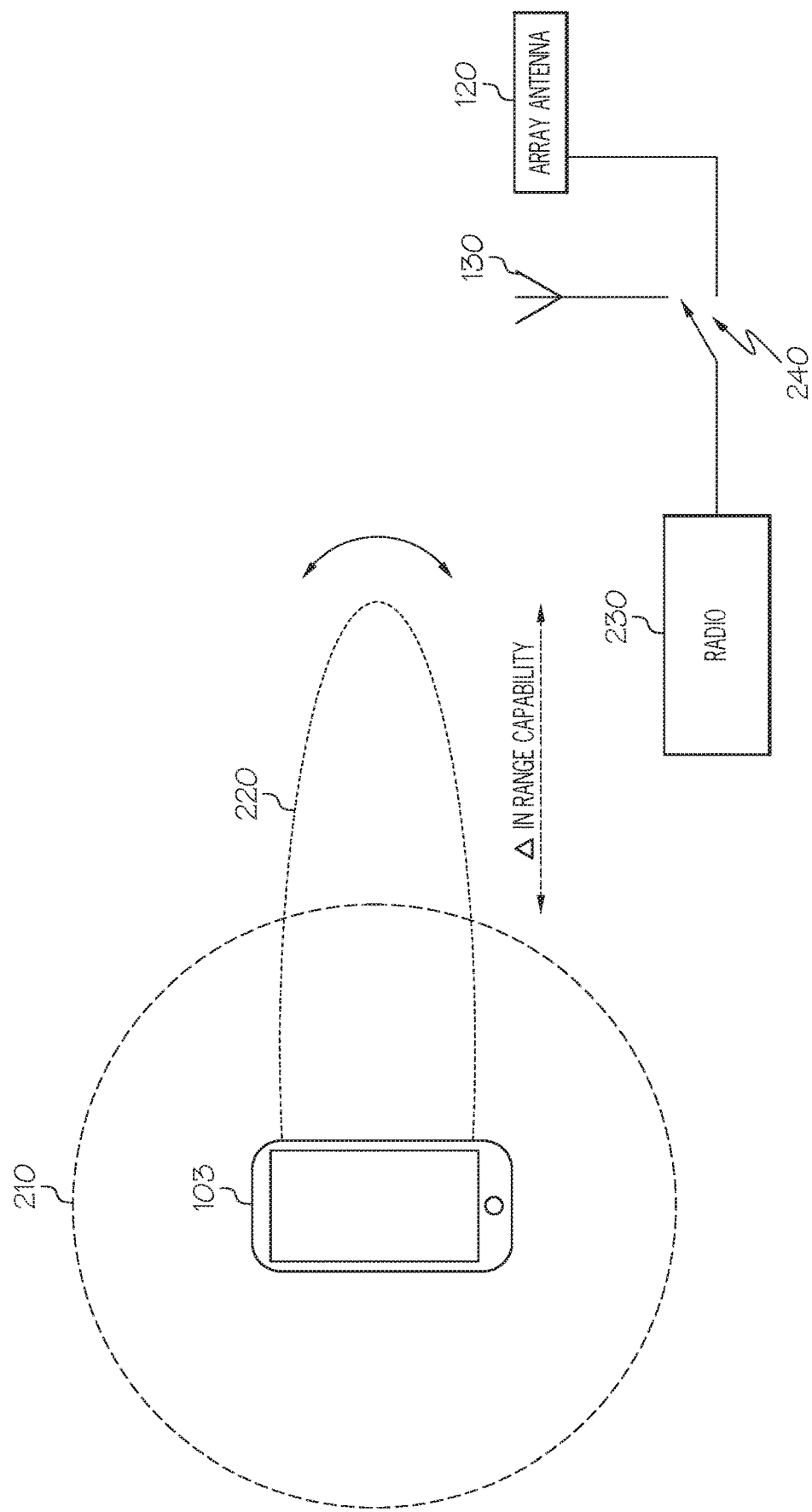

FIG. 2A illustrates a wireless electronic device 103 that includes a radio transmitter 230 that is configured to use an array antenna 120 and/or an omni-directional antenna 130 to transmit/receive wireless signals. The array antenna 120 and/or an omni-directional antenna 130 may be integrated with the wireless electronic device 103. The array antenna 120 may use beam selection or beam forming to transmit a beam 220 for communication with a base station. The omni-directional antenna 130 may transmit a radiation pattern 210 in most or all directions around the wireless electronic device 103. A switch 240 may be used by the wireless electronic device 103 to switch the communication between the array antenna 120 and the omni-directional antenna 130. Switch 240 may be a semiconductor switch with a fast switching time, such as 100 nanoseconds. Switching between the array antenna 120 and the omni-directional antenna may occur in a much shorter time than beam forming to change the beams used for communication, which may take 100 µsec to 500 µsec. The array antenna 120 may have greater range capability for acceptable communication when compared to the omni-directional antenna 130. The range of communication may depend on the number of array antenna elements of the array antenna 120 that are configured for use during a given communication. The array antenna and/or the omni-directional antenna may have a transmission range that depends on factors such as transmitter power, operation frequency, etc. For example, the array antenna 120 may have a range of 200 meters in 5G networks wherein the omni-directional antenna 130 may have range of 50 meters.

Figure 2B:
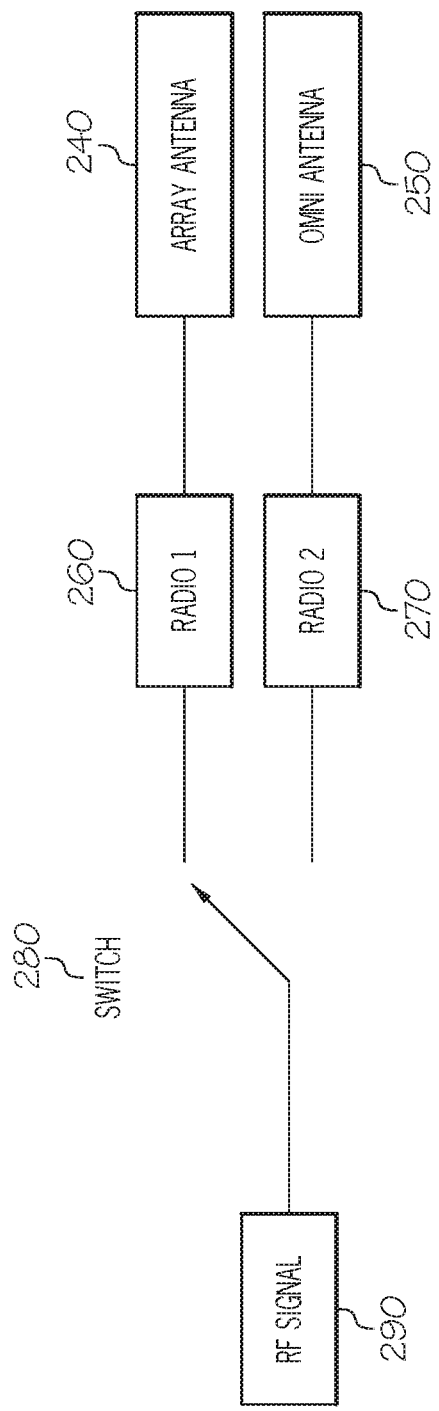

FIG. 2B illustrates a switching configuration with multiple radio transmitters to use an array antenna 240 and/or an omni-directional antenna 250 to transmit/receive wireless signals. RF signal 290 may be switched by switch 280 to a first radio transmitter 260 or a second radio 270. The first radio transmitter 260 is associated with array antenna 240 whereas the second radio 270 is associated with omni-directional antenna 250.

FIG. 3 illustrates a wireless electronic device 103 in communication with base station 310. During the course of operation, a user may rotate or move wireless electronic device 103 such that beam 220 that was being used for communication is no longer directed towards base station 220. In order to continue to use the array antenna, a different beam 320 may need to be configured. However, as discussed above, beam forming to configure a different beam to use for communication with the base station 310 may take 20 msec to 80 msec. The beam search procedure performed by the base station may take up to 80 msec. A base station may utilize for wider beams initially to transmit synchronization signals (SSB) during 20 msec or in a burst in each 20 msec block at each 90 degree sector in horizontal space. To sweep an entire turn around a base station tower may therefore take 20 msec times 4 sections for a total of up to 80 msec. In this case, it is assumed that the UE is sweeping its beams simultaneously. If the base station 310 is within range of the omni-directional antenna of wireless electronic device 103, a shorter time of around 100-200 nanoseconds may be used to switch the communication. A significantly faster switching time may improve the communication connection reliability and minimize dropped connections.

Antenna switching will not occur for slower change rates of the received signal strength of the communication signal. In other words, for changes rates slower than the maximum speed capability of the beam forming procedure, it is assumed that the UE is able to keep track of the downlink beam using the array antenna. The beam forming antenna is replaced with the omni-directional antenna for communication when the received signal decay rate (dB/µsec) is larger than the response speed of the UE beam former, if the signal level is suitable for the omni-directional antenna to use. In some embodiments described herein, the UE switches the communication connection to the omni-directional antenna when a risk of losing the connection is identified, based on the signal decay rate. Artificial Intelligence (AI) is applied to monitor the derivative of the received signal strength change, including the signal decay rate and/or the change rate profile over a time duration.

Switching may be triggered by various scenarios experienced by the UE. If the user of the UE is moving or turning the handset away from the dominant incoming wave direction, switching may be needed to maintain communication with the base station. A user may inadvertently place a finger or hand over the array antenna, diminishing signal strength. Channel and/or wave propagation conditions from the base station may change due to a change of reflection of an object's position. In some embodiments, an accelerometer, gyroscope, or other sensor may be used or detect movement and/or rotation. In some embodiments, signal strength and/or rate of decay of the signal may be measured and/or the derivative of the signal decay may be calculated to determine signal deterioration caused by various scenarios. Artificial intelligence learning may occur as a result of feedback of the received signal level and/or signal quality after switching has been performed. Adjustments may be made to the signal decay rate threshold based on feedback from previous switching scenarios. For example, if a switch is made to the omni-directional antenna but the communication connection is not able to be maintained, this scenario may be stored as an unsuccessful case and the signal decay rate threshold associated with the beam forming antenna may be increased. Adjusting the signal decay rate threshold may remove unwanted switching such as switching that led to switching back to the array antenna due to poor performance with the omni-directional antenna. In other words, successful switching cases and/or failure switching cases are noted and used for adjusting the thresholds.

Figures 4A, 4B:
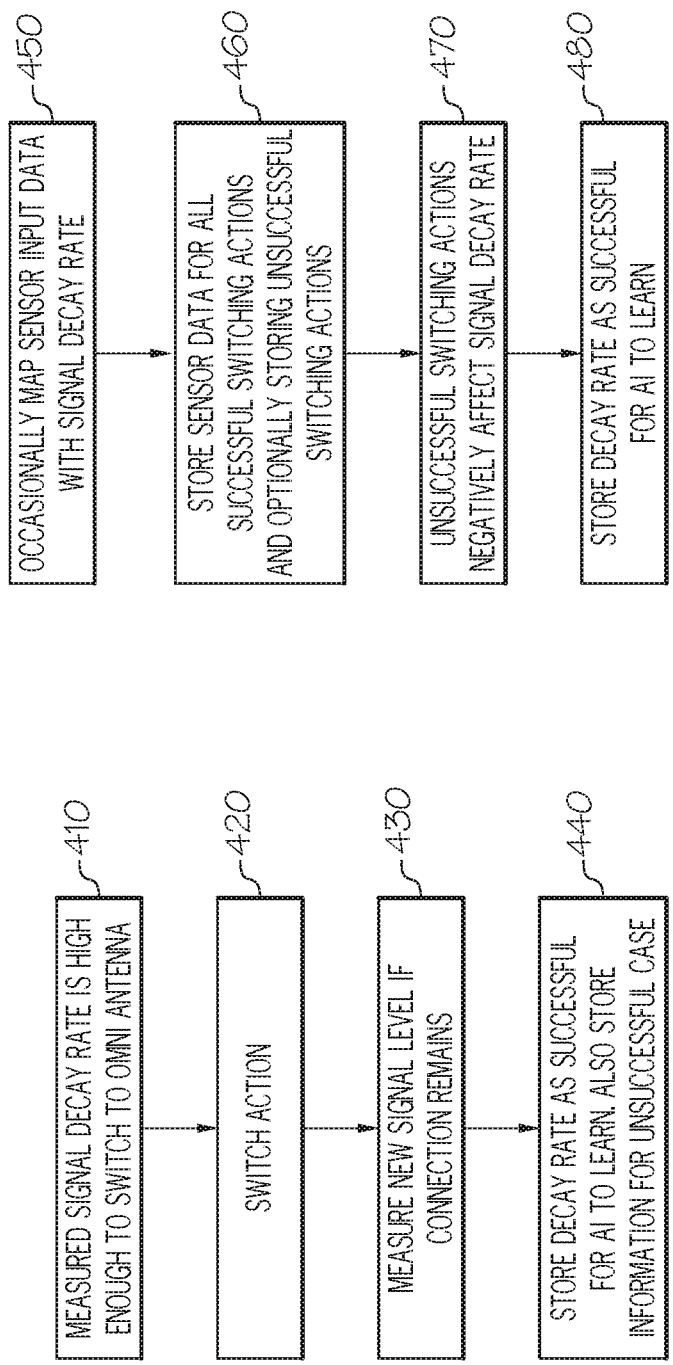
FIGS. 4A and 4B are flowcharts of operations, according to various embodiments described herein.

FIG. 4A and FIG. 4B are flowcharts of operations for switching between an array antenna and an omni-directional antenna. Referring now to FIG. 4A, signal performance may be determined for a signal received by the wireless communication device 103 of FIGS. 1A, 2, and/or 3, such as a UE. The signal decay rate may be measured to determine if the signal decay rate is high enough to switch to the omni-directional antenna, at block 410. The switching action may occur at block 420. The switching action may entail replacing the array antenna currently being used with the omni-directional antenna of the UE for communication with the network node. If the omni-directional antenna is used, then a beam sweep to configure the array antenna is not needed, saving time on the switching. As communication occurs, a new signal level (i.e. signal performance) may be measured, at block 430. If the switching action is successful, resulting in successful communication with the base station, the signal decay rate at which the successful switching occurred may be stored, at block 440. Information related to unsuccessful switching cases may also be stored to improve the artificial learning process. For example, a signal decay rate at which switching to the omni-directional antenna occurs may result in the communication connection being dropped. This information regarding the unsuccessful signal decay rate may be stored and used in adjusting a threshold signal decay rate. Thus, unsuccessful switching actions may adjust the threshold signal decay rate to a higher value.

Referring now to FIG. 4B, sensor input data from sensors, such as an accelerometer or gyroscope, may be mapped periodically with the signal decay rate, at block 450. Sensor data may be stored for successful switching operations and optionally stored for unsuccessful switching operations, at block 460. Unsuccessful switching actions may negatively affect the signal decay rate, at block 470. The signal decay rate may be stored for successful cases to provide to the AI learning mechanism, at block 480. A higher precision decision criterion may be gradually created for determining when to switch antennas. Thus, rapid changes to the signal strength that may not be adequately tracked by the beam forming antenna would trigger switching to a different antenna.

Figure 5:
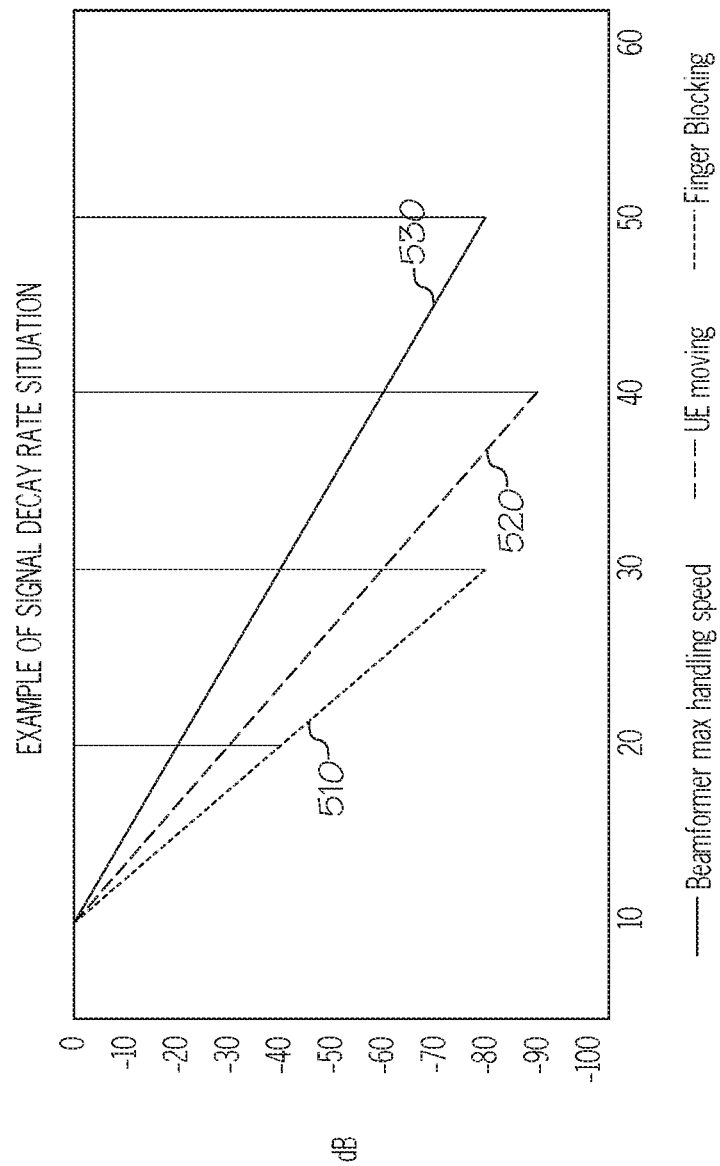
FIG. 5 is a graph of signal decay situations, according to various embodiments described herein.

FIG. 5 is a graph of signal decay situations. Curve 510 models a finger blocking a transmission from the array antenna. Curve 520 models a UE moving or rotating. Curve 530 models a maximum handling speed of the beam forming antenna currently being used for communication. If the decay rate curve is steeper than the maximum handling curve 530, i.e. a threshold curve, then the antenna would be switched. Thus, the decay rate threshold is based on the response speed of the UE's beam forming antenna.

Figure 6:
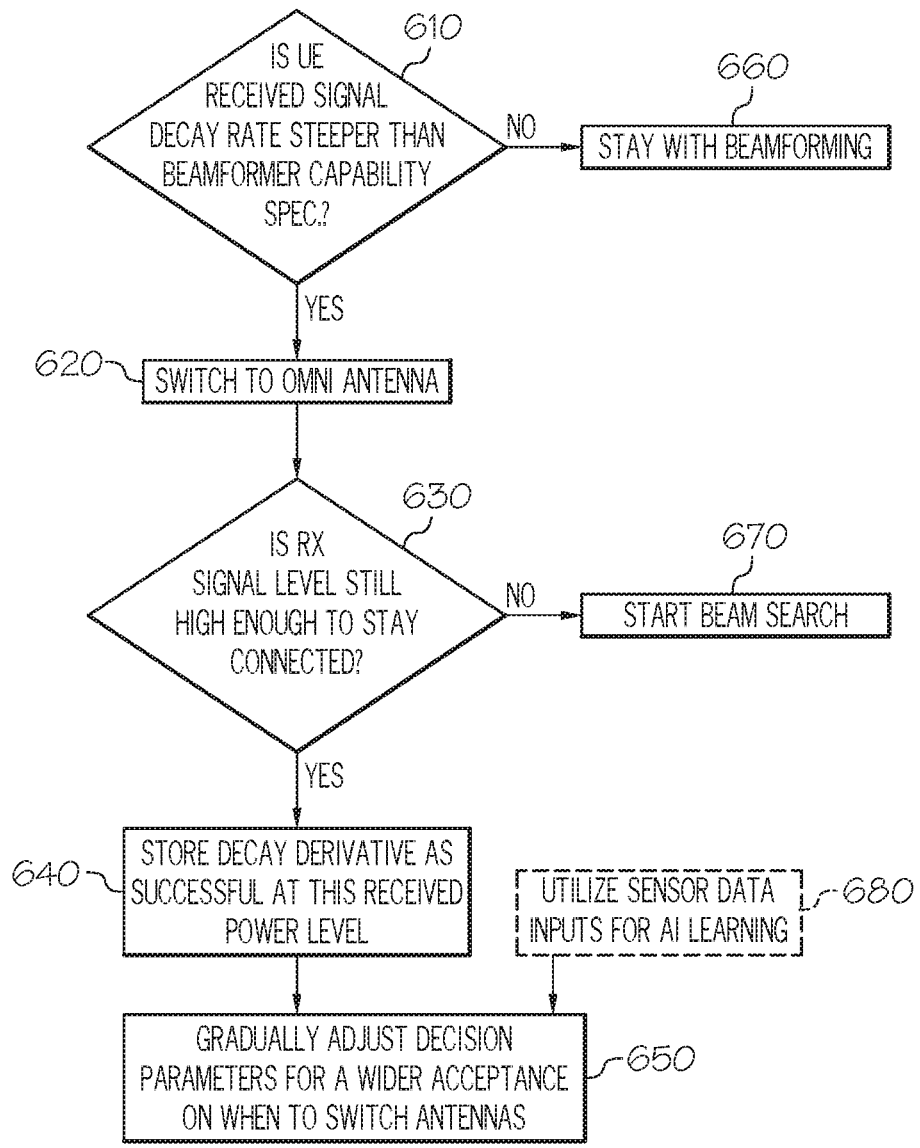
FIGS. 6 to 11 are flowcharts of operations for antenna selection, according to various embodiments described herein.

FIG. 6 is a flowchart of operations for antenna selection, according to various embodiments described herein. Referring to FIG. 6, it may be determined if the signal that is received at the UE has a signal decay rate that is steeper than the beam former capability specification of the array antenna, at block 610. If the received signal does not have a decay rate that is steeper than the beam former capability, then the communication transmission continues with the beam forming antenna, at block 660. If the received signal has a decay rate that is steeper than the beam former capability, then communication is switched to the omni-directional antenna, at block 620. A check is made if the received signal level is suitable to stay connected to the omni-directional antenna, at block 630. If the signal strength is not suitable to stay connected, a beam search is started by the beam forming antenna, at block 670. If the signal strength is suitable to stay connected, the decay derivative that is based on the signal decay rate is stored as a successful case at the received signal power level, at block 640. Decision parameters may be gradually adjusted for a wider acceptance of when to switch antennas, at block 650. In some embodiments, sensor data may be utilized as an input for artificial intelligence learning, at block 680. The sensor data may be used in conjunction with the signal performance information to adjust the signal decay rate threshold of the beam forming antenna.

Figure 7:
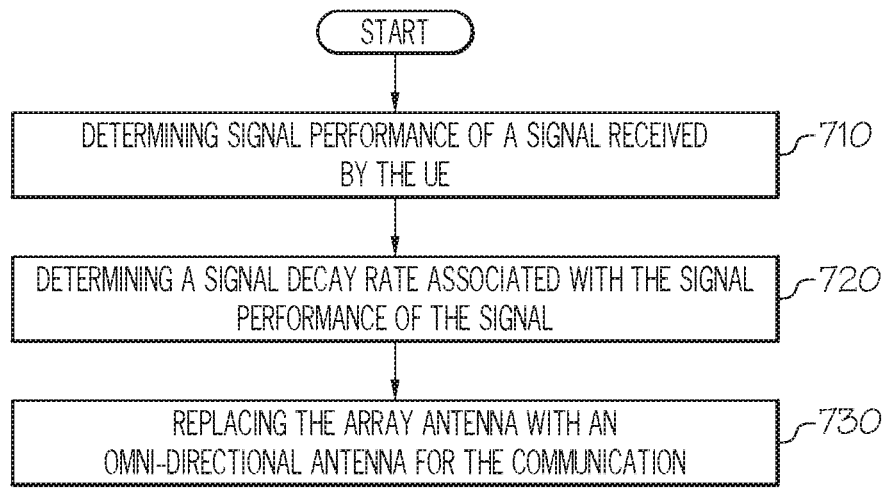

FIG. 7 is the flowchart of operations for antenna selection, according to some embodiments described herein. Referring now to FIG. 7, signal performance of the signal received by an array antenna of the user equipment for communication with a network node of the wireless communication system may be determined, at block 710. The signal decay rate associated with the signal performance of the signal may be determined, at block 720. The array antenna may be replaced with an omni-directional antenna for the communication with the network node, based on the signal decay rate, block 730. In other words communication may be switched from the array antenna to the omni-directional antenna, responsive to the signal decay rate. An increased signal decay rate may indicate deterioration of the communication channel. Therefore, if the signal delay rate exceeds a threshold, such as illustrated by the curve 530 in FIG. 5, it may be determined that communication has a poor signal to noise ratio or other performance problems when using the array antenna, triggering switching to an omni-directional antenna.

Figure 8:
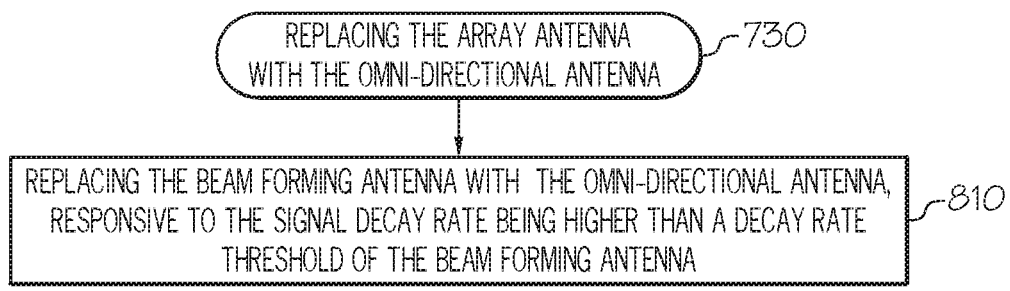

FIG. 8 is the flowchart of operations for antenna selection, according to some embodiments described herein. In some embodiments, switching the communication from the array antenna to an omni-directional antenna may include replacing the beamforming antenna with the omni-directional antenna, responsive to the signal decay rate being higher than the decay rate threshold of the beamforming antenna, at block 810.

Figure 9:
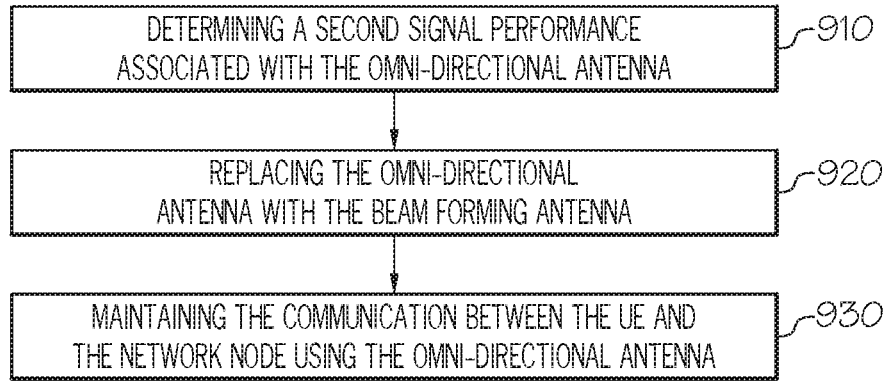

FIG. 9 is the flowchart of operations for antenna selection, according to some embodiments described herein. Referring now to FIG. 9, signal performance associated with the omni-directional antenna may be determined, at block 910. Responsive to the signal performance of the omni-directional antenna being less than a signal performance threshold of the omni-directional antenna, the communication may be replaced from the omni-directional antenna to the beam forming antenna, at block 920.

Figure 10:
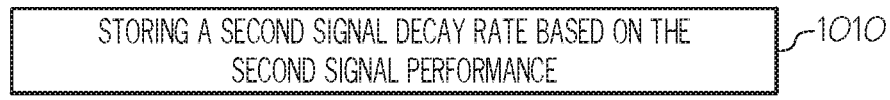

FIG. 10 is the flowchart of operations for antenna selection, according to some embodiments described herein. Referring now to FIG. 10, a second signal decay rate based on the second signal performance may be stored, responsive to the second signal performance being greater than the second signal performance threshold associated with the omni-directional antenna, at block 1010.

Figure 11:
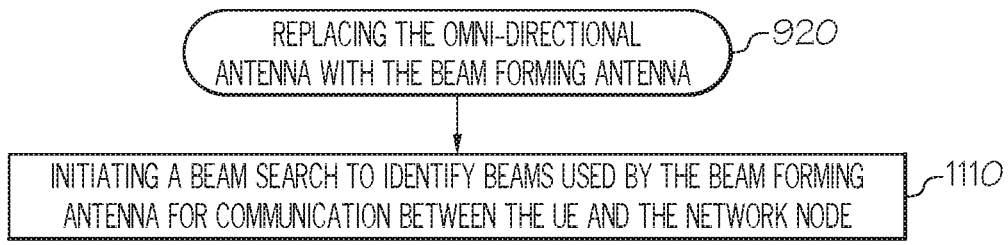

FIG. 11 is the flowchart of operations for antenna selection, according to some embodiments described herein. Referring now to FIG. 11, replacing the omni-directional antenna with the beam forming antenna may include initiating a beam search to identify beams used by the beam forming antenna for communication between the wireless electronic device and the network node, at block 1110.

Figure 12:
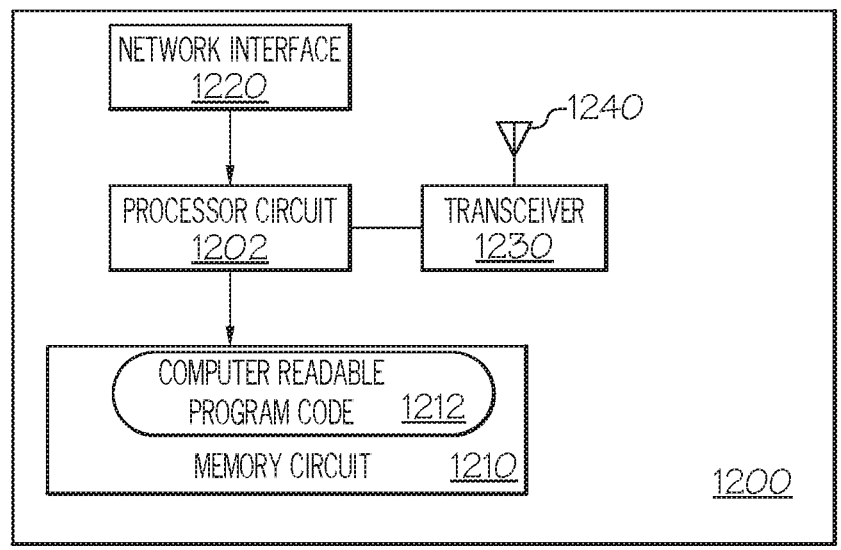
FIGS. 12 and 13 are block diagrams of wireless electronic devices, according to various embodiments described herein.

FIG. 12 is a block diagram of a wireless electronic device 1200, such as a UE or wireless electronic device 103 of FIG. 1. The wireless electronic device 1200 may be configured to perform operations according to one or more embodiments disclosed herein. Referring to FIG. 12, the wireless electronic device 1200 includes a network interface 1220, a transceiver 1230, an antenna 1240, a processor circuit 1202, and a memory or memory circuit 1210 containing computer readable program code 1212. The processor or processor circuit 1202 may include one or more data processing circuits, such as a general purpose and/or special purpose processor, e.g., microprocessor and/or digital signal processor, which may be collocated or distributed across one or more networks. The processor circuit 1202 is configured to execute the computer readable program code 1212 in the memory 1210 to perform at least some of the operations and methods of described herein as being performed by the wireless electronic device 1200. A wireless interface may be coupled to the processor circuit 1202 and may communicate with a server or other external network entity, directly or indirectly.

Figure 13:
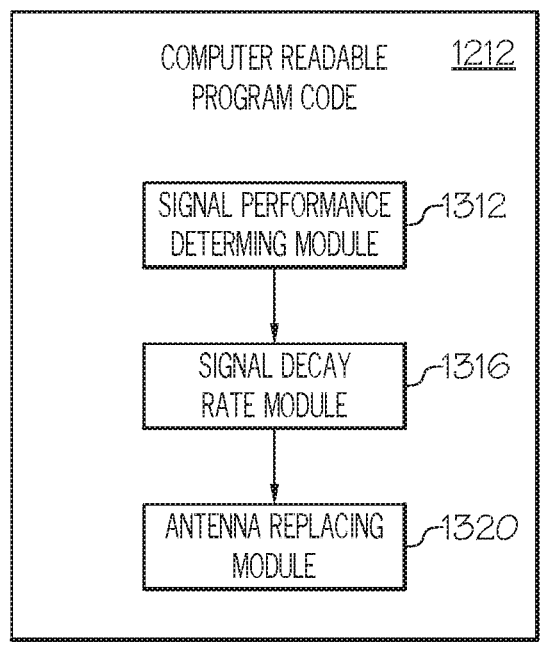

FIG. 13 illustrates modules for an antenna selection module that perform operations as disclosed herein according to some embodiments. The computer readable program code 1212 of FIG. 12 may include one or more modules. Referring now to FIG. 13, the computer readable program code 1212 may include a signal performance determining module 1312, a signal decay rate module 1316, and an antenna replacing module 1324. The signal performance determining 1312 is for determining signal performance of a signal received by the UE (block 710 of FIG. 7). The signal decay rate module 1316 is for determining a signal decay rate associated with the signal performance of the signal (block 720 of FIG. 7). The antenna replacing module 1320 is for replacing the array antenna with an omni-directional antenna of the UE for communication with the network node, based on the signal decay rate (block 730 of FIG. 7). The modules 1312, 1316, and 1320 may perform other corresponding operations and methods disclosed herein.

FURTHER EMBODIMENTS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular fours "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method for antenna selection, performed by a user equipment, UE, in a wireless communication system, the method comprising:
   determining signal performance of a signal received by the UE, wherein the signal is received by an array antenna of the UE for communication with a network node of the wireless communication system;
   determining a signal decay rate associated with the signal performance of the signal; and
   replacing the array antenna with an omni-directional antenna of the UE for communication with the network node, based on the signal decay rate.

2. The method of claim 1, wherein the array antenna comprises a beam forming antenna.

3. The method of claim 1, wherein the replacing the array antenna with an omni-directional antenna of the UE for communication with the network node is further based on a profile of the signal decay rate of the signal over a time duration.

4. The method of claim 2, wherein the replacing the array antenna with an omni-directional antenna comprises:
   replacing the beam forming antenna with the omni-directional antenna for the communication with the network node, responsive to the signal decay rate being greater than a decay rate threshold associated with the beam forming antenna.

5. The method of claim 2,
   wherein the decay rate threshold is based on a response speed of the beam forming antenna.

6. The method of claim 4, wherein the signal comprises a first signal, wherein the signal performance comprises a first signal performance, wherein the signal decay rate comprises a first signal decay rate, and wherein the decay rate threshold comprises a first decay rate threshold, the method further comprising:
   determining a second signal performance of a second signal, wherein the second signal is received by the omni-directional antenna after the replacing the beam forming antenna to the omni-directional antenna;
   replacing the omni-directional antenna with the beam forming antenna for the communication with the network node, responsive to the second signal performance being less than a second signal performance threshold associated with the omni-directional antenna; and
   maintaining the communication between the UE and the network node using the omni- directional antenna, responsive to the second signal performance being greater than the second signal performance threshold associated with the omni-directional antenna.

7. The method of claim 6, further comprising:
   storing a second signal decay rate based on the second signal performance, responsive to the second signal performance being greater than the second signal performance threshold associated with the omni-directional antenna.

8. The method of claim 6, wherein the first decay rate threshold associated with the beam forming antenna is adjusted responsive to signal quality feedback.

9. The method of claim 6, wherein the first decay rate threshold associated with the beam forming antenna is adjusted responsive to the first signal decay rate and/or the second signal decay rate.

10. The method of claim 6, wherein the omni-directional antenna performance threshold and/or the first decay rate threshold associated with the beam forming antenna are adjusted based on previous switching information.

11. The method of claim 6, wherein the first decay rate threshold associated with the beam forming antenna is adjusted based on the second signal performance that triggered a switching decision to replace the omni-directional antenna with the beam-forming antenna.

12. The method of claim 1,
   wherein the determining the signal performance of the signal received by the UE is triggered based on sensor data from one or more sensors, and
   wherein the sensor data indicates a rotation of the UE, blocking of the signal, and/or a change in characteristics of the signal received by the UE.

13. The method of claim 2, wherein the beam forming antenna is configured to use a subset of available beams to perform beam steering of the communication between the UE and the network node.

14. A wireless electronic device used in a wireless communication system, the wireless electronic device comprising:
   an antenna control module configured to perform operations comprising:
   determining signal performance of a signal received by the wireless electronic device, wherein the signal is received by an array antenna of the wireless electronic device for communication with a network node of the wireless communication system;
   determining a signal decay rate associated with the signal performance of the signal; and
   replacing the array antenna with an omni-directional antenna of the wireless electronic device for communication with the network node, based on the signal decay rate.

15. The wireless electronic device of claim 14,
   wherein the array antenna comprises a beam forming antenna, and
   wherein the signal decay rate corresponds to a derivative of a signal strength of the signal received by the wireless electronic device.

16. The wireless electronic device of claim 15, wherein the replacing the array antenna with the omni-directional antenna comprises:
   replacing the beam forming antenna with the omni-directional antenna for the communication, responsive to the signal decay rate being greater than a decay rate threshold associated with the beam forming antenna.

17. The wireless electronic device of claim 15, wherein the signal comprises a first signal, wherein the signal performance comprises a first signal performance, wherein the signal decay rate comprises a first signal decay rate, and wherein the decay rate threshold comprises a first decay rate threshold, and wherein the antenna control module is further configured to perform operations comprising:
   determining a second signal performance of a second signal, wherein the second signal is received by the omni-directional antenna after the replacing the beam forming antenna to the omni-directional antenna;

replacing the omni-directional antenna with the beam forming antenna for the communication with the network node, responsive to the second signal performance being less than a second signal performance threshold associated with the omni-directional antenna; and maintaining the communication between the UE and the network node using the omni- directional antenna, responsive to the second signal performance being greater than the second signal performance threshold associated with the omni-directional antenna.

18. The wireless electronic device of claim 15, wherein the antenna module is further configured to perform operations comprising:

storing a second signal decay rate based on the second signal performance, responsive to the second signal performance being greater than the second signal performance threshold associated with the omni-directional antenna.

19. The wireless electronic device of claim 14, wherein the first decay rate threshold of the beam forming antenna is adjusted responsive to signal quality feedback.

20. The wireless electronic device of claim 15, wherein the replacing the omni-directional antenna with the beam forming antenna comprises:

initiating a beam search to identify beams used by the beam forming antenna for communication between the wireless electronic device and the network node.

* * * * *